US 8,139,206 B2

(12) United States Patent
Antoniou et al.

(10) Patent No.: US 8,139,206 B2
(45) Date of Patent: Mar. 20, 2012

(54) METHOD AND ARRANGEMENT TO DETERMINE A WIND-SPEED

(75) Inventors: Ioannis Antoniou, Lyngby (DK); Soeren Markkilde Pedersen, Stenløse (DK)

(73) Assignee: Siemens Aktiengesellschaft, Munich (DE)

( * ) Notice: Subject to any disclaimer, the term of this patent is extended or adjusted under 35 U.S.C. 154(b) by 254 days.

(21) Appl. No.: 12/574,724

(22) Filed: Oct. 7, 2009

(65) Prior Publication Data

US 2010/0085557 A1  Apr. 8, 2010

(30) Foreign Application Priority Data

Oct. 8, 2008 (EP) .................... 08017664

(51) Int. Cl.
*G01P 3/36* (2006.01)

(52) U.S. Cl. ....... 356/28; 356/3.01; 356/4.01; 356/5.01; 356/28.5

(58) Field of Classification Search ........ 356/3.01–3.15, 356/4.01–4.1, 5.01–5.15, 6–22, 28, 28.5, 356/139.01–139.1

See application file for complete search history.

(56) References Cited

U.S. PATENT DOCUMENTS

| 2006/0140764 A1* | 6/2006 | Smith et al. .................. 416/103 |
| 2009/0046289 A1* | 2/2009 | Caldwell et al. ............. 356/341 |

FOREIGN PATENT DOCUMENTS

WO  WO 2004/077068 A1  9/2004

OTHER PUBLICATIONS

Vaughan et al., "Laser Doppler Velocimetry Aplied to the Measurement of Local an Global Wind", Wind Engineering, Jan. 1989, pp. 1-15, Multi-Science Publishing Co, Brentwood, Essex, GB, XP002057358, ISSN: 0309-524X.

* cited by examiner

*Primary Examiner* — Thomas Tarcza
*Assistant Examiner* — Luke Ratcliffe

(57) ABSTRACT

A method and an arrangement are provided to determine the speed of the wind, which acts on a wind-blade of a wind-turbine. An optical-signal with a known frequency is sent from an optical-transmit-unit to a joint measurement volume. The optical-signal is scattered and reflected by atmospheric particles of the joint measurement volume. The optical signal is shifted in its frequency due to the Doppler-principle, too. The frequency-shifted optical signal is received by a receive-unit. The frequency-shifted optical signal is compared with the sent optical-signal to determine the wind-speed based on the shifted frequency, which is caused by the atmospheric particles.

20 Claims, 3 Drawing Sheets

METHOD AND ARRANGEMENT TO DETERMINE A WIND-SPEED

CROSS REFERENCE TO RELATED APPLICATIONS

This application claims priority of European application No. 08017664.7 filed Oct. 8, 2008, which is incorporated by reference herein in its entirety.

FIELD OF THE INVENTION

The invention relates to a method and to an arrangement to determine the speed of the wind, which acts on a blade of a wind-turbine.

BACKGROUND OF THE INVENTION

Wind speed measurements on wind turbines are known to take place with a cup-anemometer or with a sonic-anemometer, which is normally mounted on a rear-part of a wind-turbine-nacelle. Because of this mounting position the wind-speed is measured, when the wind has already passed the rotating blades of the wind-turbine.

This wind-speed can not be used to change settings of the rotating blades, in order to optimize and thus reduce the wind-load acting on the rotating blades or optimize the output-power of the wind-turbine.

Modern wind-turbines have rotor diameters, which is defined by the rotating blades, of more than 100 meter. The changes of the wind speed over the rotor of such turbines may be considerable. It is therefore even more important for this kind of wind-turbine, to know the speed of the wind over the whole rotor before it passes the rotating blades in order to successfully optimize the turbine's operation.

So called "five-hole pitot-tubes" are used for wind-speed-measurements. The pitot-tubes are located at a leading-edge of a blade and the tubes are placed at a distance of one to two chords from the leading edge. The pitot-tube typically has a semi-spherical head, which is equipped with five surface-holes. These holes are arranged on two perpendicular rows and are connected with small tubes. At the end of the tubes there are pressure-transducers mounted.

This method is complex and expensive, providing more or less precise wind-speed-information. Especially the pitot-tubes are exposed to salt and dirt and in general contamination from the atmosphere, so their wind-speed-results will in general be more influenced than when using them during wind tunnel applications and may be worse than expected.

SUMMARY OF THE INVENTION

Therefore it is aim of the invention to provide an improved method and arrangement to measure an accurate wind-speed.

This aim is solved by the features of the independent claims.

Preferred embodiments of the invention are described within the dependent claims.

The invention is based on the fact that the wind-speed and the wind-direction may change dramatically within the rotor area. This results from terrain or atmospheric conditions, where the measurement is done.

The invention relates to a method and to an arrangement to determine the speed of the wind, which acts on a wind-blade of a wind-turbine.

According to the invention an optical-signal with a known frequency is sent from an optical-transmit-unit to a joint measurement volume. The optical-signal is scattered and reflected by atmospheric particles of the joint measurement volume. The optical signal is shifted in its frequency due to the Doppler-principle, too. The frequency-shifted optical signal is received by a receive-unit. The frequency-shifted optical signal is compared with the sent optical-signal to determine the wind-speed based on the shifted frequency, which is caused by the atmospheric particles moving with the wind.

According to the invention the speed of an incoming wind is measured, before the wind passes the blades of the wind-turbine. The wind-speed of the incoming wind is measured by an optical-system, which is a so called "LIDAR"-system in a preferred embodiment.

"Light Detection and Ranging, LIDAR" is an optical remote sensing technology, which uses scattered light to determine information of a distant target.

In the present case the information, which has to be determined, is the speed of the air in a line-of-sight. It is assumed, that scattered atmospheric particles, due to their very small size and weight, follow well the wind motion.

The used system includes an optical transmit-unit (maybe a laser-unit), which generates and sends optical-signals.

The optical signals are scattered and reflected by the atmospheric particles. Due to the "Doppler-principle" the frequency of the emitted optical signal is changed, too. This change is proportional to the wind-speed in the line-of-sight.

The system includes an optical receive-unit, which is combined with the transmit-unit. The receive-unit receives the frequency-shifted optical signal.

The scattered and reflected optical signal is analyzed by an electronic-unit and a computer to determine the wind-speed.

In a preferred embodiment of the invention the LIDAR-system uses laser-light to determine the wind-speed.

The transmit-unit and the receive-unit is located/mounted at the rotor-blades of the wind-turbine. The electronic unit and the computer can be mounted either close to the transmit/receive unit or can be situated at the rotor hub.

The wind-speed in the line-of-sight results from an integration over a given distance defined within the line-of-sight and over a given volume around an area, where the optical receive-unit and the optical transmit-unit is focused.

This given distance increases, when the focusing-distance to the optical receive/transmit-unit increases.

The measured wind-speed is combined with the knowledge of the deformation of the blade, with the position of the blade, with the pitch-angle and the twist of the blade, with the angular wind-speed and with the rotor-coning and with the rotor-tilt as well.

This leads to a three-dimensional wind-vector, which is now used to adjust settings of the wind turbine, like the blade-pitch, the number of rotor-revolutions per minute, etc.

So it is possible to reduce the wind-load acting on the wind-turbine/on the rotating blades on one hand and to enhance the output-power of the wind-turbine by a blade-regulation as described above on the other hand.

BRIEF DESCRIPTION OF THE DRAWINGS

The invention is described in more detail by help of some figures, where.

DETAILED DESCRIPTION OF THE INVENTION

Within this the transmit-unit and the receive-unit are combined to a transmit/receive-unit.

In the following the term "measurement-volume" relates to a volume of a light beam, which is assumed to be minimal in diameter relative to its length.

Figure 1:
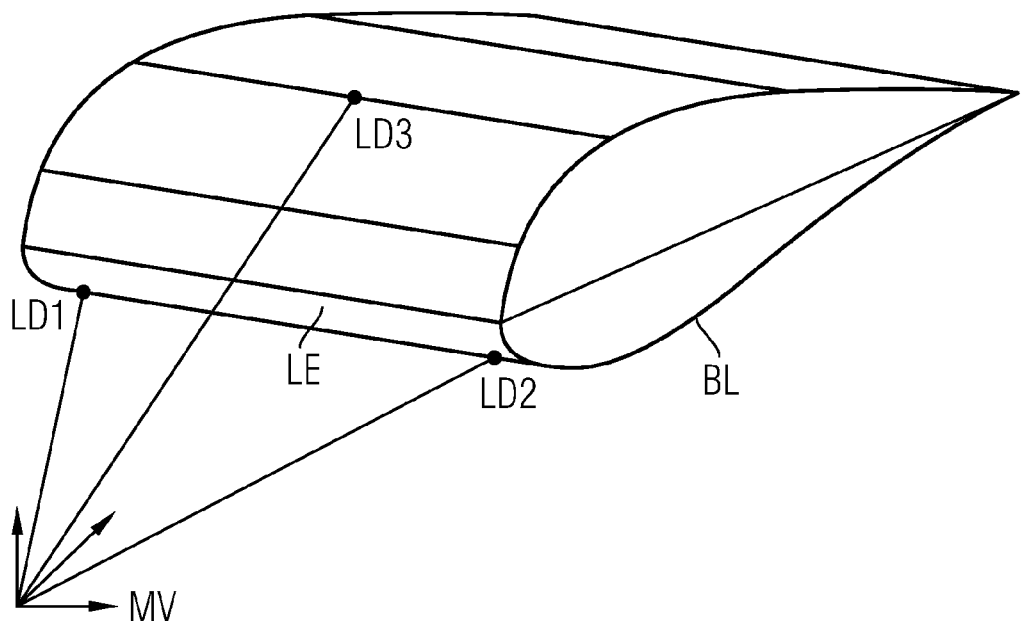
FIG. 1 to FIG. 5 are showing some possibilities to locate optical receive/transmit-units of a Lidar-system on a blade of a wind-turbine according to the invention.

FIG. 1 shows a first possibility to locate optical receive/transmit-units of a LIDAR-system on a blade BL of a wind-turbine.

Three optical receive/transmit-units LD1, LD2 and LD3 are located above and below a leading-edge LE of the blade BL, while the blade BL is shown in a cross-sectional-view.

The three optical receive/transmit-units LD1, LD2 and LD3 are aligned to the joint measurement-volume MV. By a combination of the wind-speeds, which are measured by the three optical receive/transmit-units LD1 to LD3, it is possible to determine three wind-speed components, which are relative to a plane defined by the rotating rotor-blades.

For this determination the knowledge about the blade-deformation, the blade-azimuth-position, the pitch-angle of the blade, the twist of the blade, the angular wind-speed, the rotor-coning and the tilt of the rotor is used.

Figure 2:
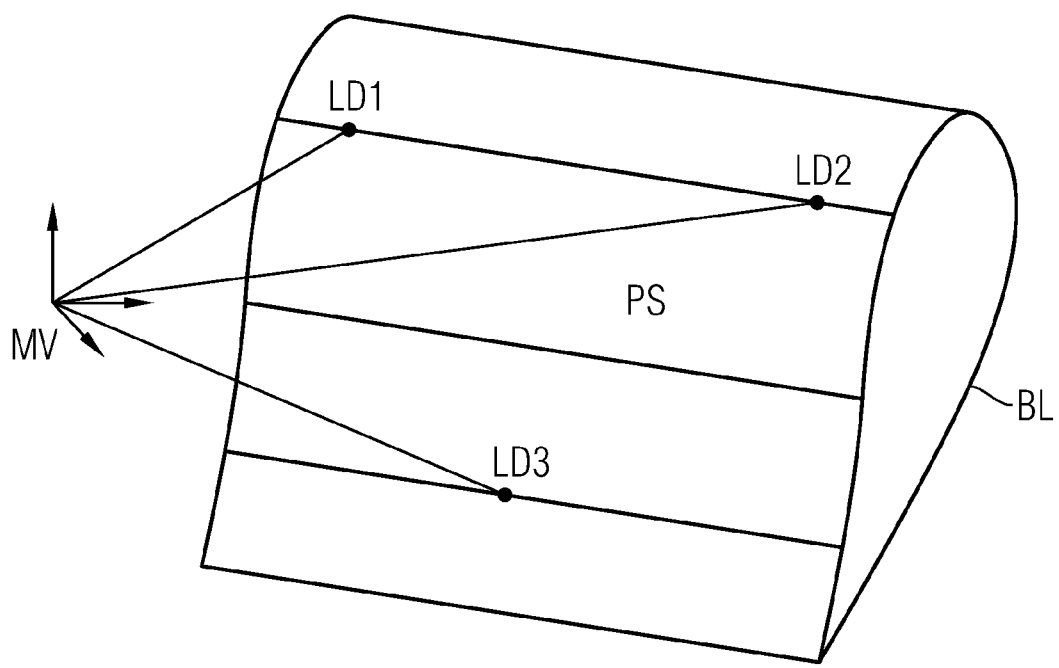

FIG. 2 shows a second possibility to locate optical receive/transmit-units of a Lidar-system on a blade BL of a wind-turbine.

Three optical receive/transmit-units LD1, LD2 and LD3 are located on a pressure-side PS of the blade BL, while the blade BL is shown in a cross-sectional-view.

The three optical receive/transmit-units are aligned as described in FIG. 1 to the joint measurement-volume MV.

Figure 3:
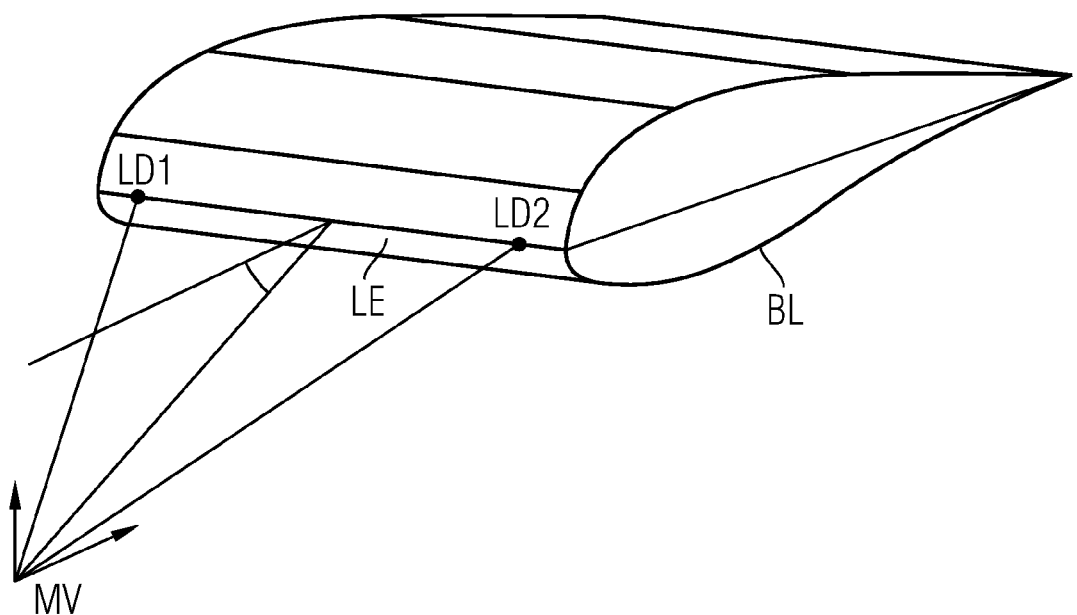

FIG. 3 shows a third possibility to locate optical receive/transmit-units on a blade BL.

Two optical receive/transmit-units LD1 and LD2 are located at or around the leading edge LE of the blade BL, while the blade BL is shown in a cross-sectional-view.

The two optical receive/transmit-units LD1, LD2 are aligned as described in FIG. 1 and FIG. 2 to a joint punctual measurement-volume MV.

Figure 4:
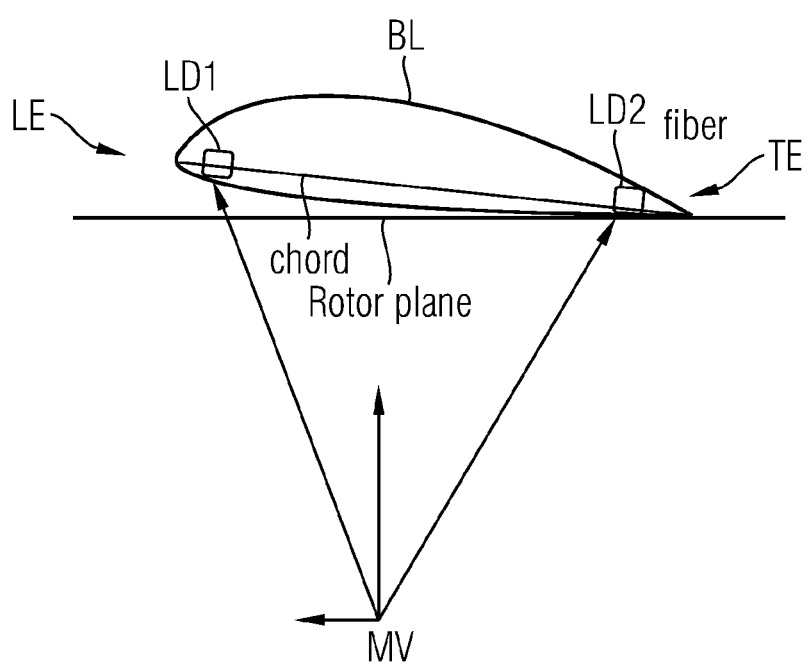

FIG. 4 shows a fourth possibility to locate optical receive/transmit-units of a Lidar-system on a blade BL.

Two optical receive/transmit-units LD1 and LD2 are located along a chord, which has a certain angle to the rotor-plane.

A first optical receive/transmit-unit LD1 is placed close to the leading-edge LE, while a second optical receive/transmit-unit LD2 is placed close to trailing-edge TE of the blade BL.

The blade BL is shown in a cross-sectional-view.

The two optical receive/transmit-units LD1, LD2 are aligned to the joint punctual measurement-volume MV.

The optical receive/transmit-units LD1, LD2 are formed as a fiber in a preferred embodiment.

Figure 5:
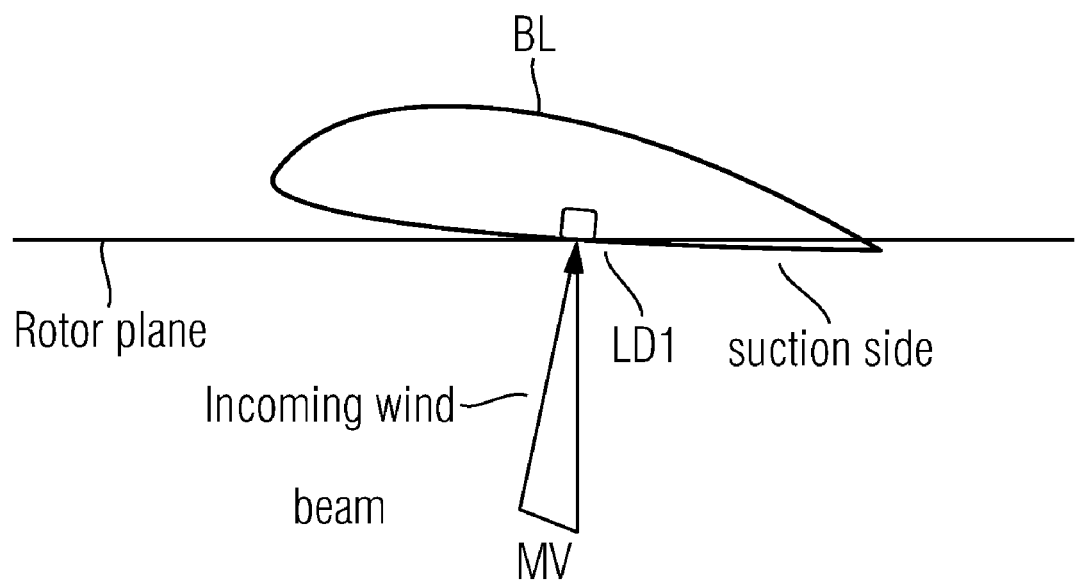

FIG. 5 shows a fifth possibility to locate an optical receive/transmit-unit on a blade BL.

Only one optical receive/transmit-unit LD1 is located on a suction-side of the blade BL, while the blade BL is shown in a cross-sectional-view.

The optical receive/transmit-unit LD1 is aligned to the punctual measurement-volume MV.

In this figure the suction surface is on the top of the blade BL.

As it can be seen, the presented configurations of the figures from FIG. 1 to FIG. 5 show increasing simplicity but decreasing information level, too.

The configurations of FIG. 3 up to FIG. 5 will influence the accuracy of the measurement of the incoming wind-speed compared with to the configurations of FIG. 1 and FIG. 2. But the simplified versions are cheaper and are still serving the purpose of a regulation of the wind-turbine to follow the incoming wind.

In the end there are some finally remarks to the invention described above:

Modern "Multi-Mega-Watt" wind-turbines rotate slowly. Thus the configurations as described above can be repeated on one or more blades. Because of this the rate of wind-information is enhanced by measurements, which are done in several heights at one time.

Because of the safety of the wind-turbine-rotor it is a preferred configuration, to locate the optical transmit/receive units at the blade itself, while remaining parts of the LIDAR-apparatus is situated at the hub of the wind-turbine.

In a preferred configuration fibers are used to form a part of the optical transmit/receive units.

In a simplified configuration one LIDAR-apparatus for the determination of the wind-speed is assigned to all of the optical transmit/receive units, which are located on the blades of a single wind-turbine. So there is a kind of "multiplexing" between the units.

The invention claimed is:

1. A method for determining a wind-speed of a wind acting on a blade of a wind-turbine, comprising:
    sending an optical-signal with a known frequency from an optical transmit-unit to a joint measurement volume;
    scattering the sent optical-signal and reflecting the sent optical-signal by atmospheric particles of the joint measurement volume;
    shifting the known frequency of the sent optical signal due to a Doppler-principle;
    receiving the frequency-shifted optical signal by an optical receive-unit;
    comparing the frequency-shifted optical-signal with the sent optical-signal;
    determining the wind-speed based on the shifted frequency caused by the atmospheric particles moving with the wind;
    combining the wind-speed with a factor for determining a three-dimensional wind-vector; and
    adjusting a setting of the wind-turbine according to the three-dimensional wind-vector.

2. The method as claimed in claim 1, wherein the wind-speed is determined by a LIDAR-system with a laser-light.

3. The method as claimed in claim 1, wherein:
    the optical transmit-unit and the optical receive-unit are located on a blade of the wind-turbine and are aligned to the joint measurement-volume,
    the joint measurement-volume is defined by a given distance within a line-of-sight and by a given volume around an area where the optical receive-unit and the optical transmit-unit are focused, and
    the wind-speed in the line-of-sight is determined from an integration that is dependant on the joint measurement-volume.

4. The method as claimed in claim 1, wherein the wind-speed is determined by a unit located into a hub of the wind-turbine.

5. The method as claimed in claim 1, wherein the factor is selected from the group consisting of: a deformation of the blade, a position of the blade, a pitch-angle of the blade, a twist of the blade, an angular wind-speed of the blade, a rotor-coning, and a rotor-tilt.

6. The method as claimed in claim 1, wherein the setting of the wind-turbine comprises a blade-pitch and a number of rotor-revolutions per minute.

7. An arrangement for determining a wind-speed of a wind acting on a blade of a wind-turbine, comprising:
    an optical transmit-unit located on the blade that sends an optical-signal with a known frequency to a joint measurement-volume for scattering and reflecting the sent optical-signal by atmospheric particles of the joint measurement volume to shift the known frequency of the sent optical-signal due to a Doppler-principle;

an optical receive-unit located on the blade that receives the frequency-shifted optical-signal; and a determination-unit that compares the frequency-shifted optical-signal with the sent optical-signal and determines the wind-speed based on the shifted-frequency caused by the atmospheric particles moving with the wind, wherein the determination-unit is configured to:
combine the wind-speed with a factor for determining a three-dimensional wind-vector; and
adjust a setting of the wind-turbine according to the three-dimensional wind-vector.

8. The arrangement as claimed in claim 7, wherein the determination-unit comprises a computer.

9. The arrangement as claimed in claim 7, wherein the determination-unit is located in a hub of the wind-turbine.

10. The arrangement as claimed in claim 7, wherein the optical-signal is a laser-light-signal.

11. The arrangement as claimed in claim 7, wherein the optical receive-unit and the optical transmit-unit are integrated as a combined optical transmit/receive-unit.

12. The arrangement as claimed in claim 11, wherein at least three optical receive/transmit-units are located above and below a leading-edge of the blade.

13. The arrangement as claimed in claim 11, wherein at least three optical receive/transmit-units are located on a pressure-side of the blade.

14. The arrangement as claimed in claim 11, wherein at least two optical receive/transmit-units are located at or around a leading edge of the blade.

15. The arrangement as claimed in claim 11, wherein at least two optical receive/transmit-units are located along a chord of the blade and are placed close to a leading-edge and to a trailing-edge of the blade.

16. The arrangement as claimed in claim 11, wherein at least one optical receive/transmit-units is located on a suction-side of the blade.

17. The arrangement as claimed in claim 7, wherein the optical receive-unit and the optical transmit-unit are focused to the joint measurement-volume.

18. The arrangement as claimed in claim 7, wherein the optical receive-unit or the optical transmit-unit is located at a hub of the wind-turbine.

19. The arrangement as claimed in claim 7, wherein the optical transmit-unit or the optical receive-unit comprises a fiber.

20. The arrangement as claimed in claim 7, wherein the factor is selected from the group consisting of: a deformation of the blade, a position of the blade, a pitch-angle of the blade, a twist of the blade, an angular wind-speed of the blade, a rotor-coning, and a rotor-tilt.

* * * * *